March 12, 1935.  A. T. BAILEY  1,994,164
MANUFACTURE OF DECORATIVE PLASTIC
Filed Sept. 2, 1933
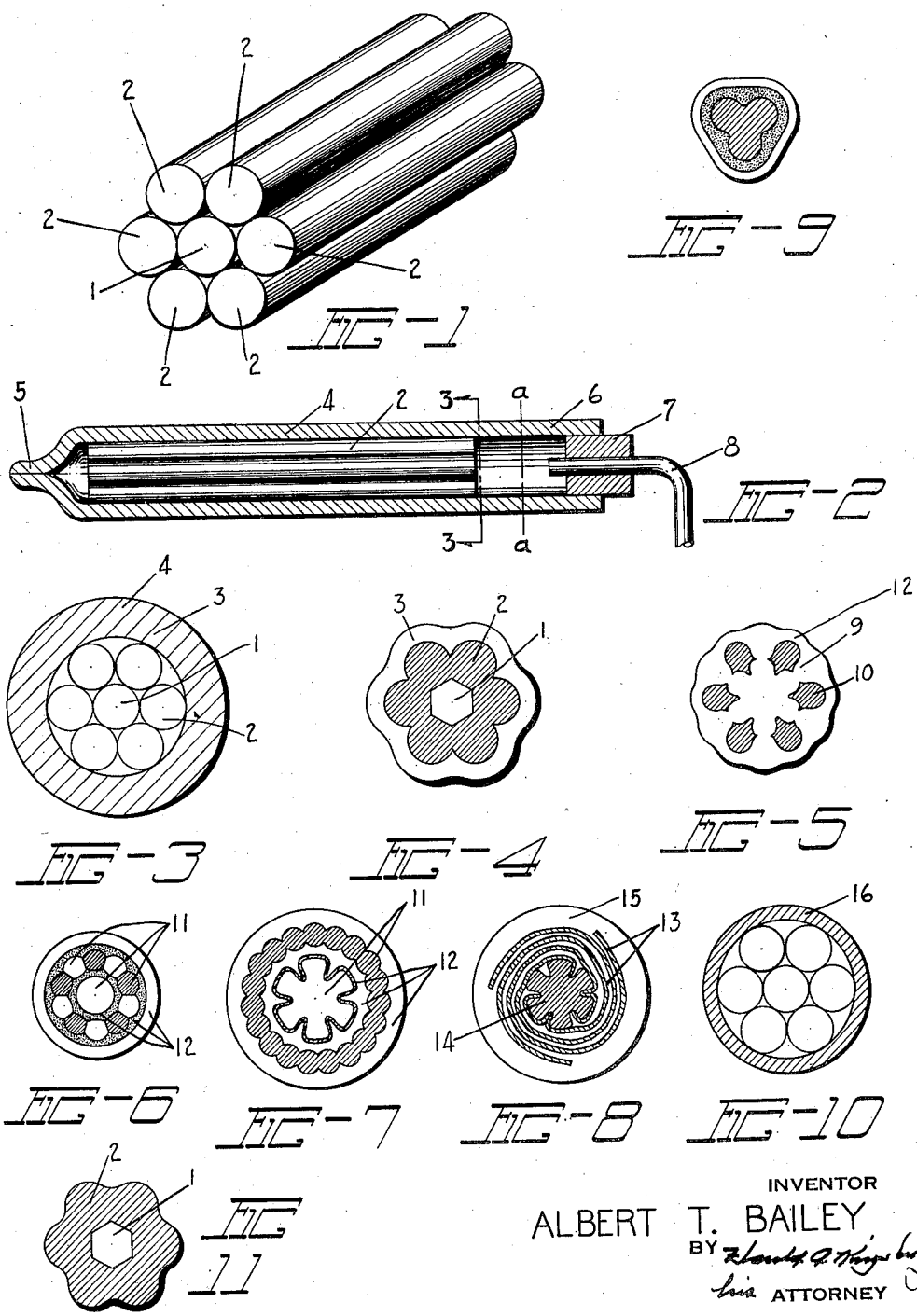
INVENTOR
ALBERT T. BAILEY Patented Mar. 12, 1935

1,994,164

UNITED STATES PATENT OFFICE 1,994,164

MANUFACTURE OF DECORATIVE PLASTIC

Albert Tanner Bailey, Montclair, N. J., assignor to Dupont Viscoloid Company, Wilmington, Del., a corporation of Delaware Application September 2, 1933, Serial No. 687,963

8 Claims. (Cl. 18—59)

This invention relates to the manufacture of decorative plastic, more particularly decorative cellulosic plastic in the form of rods having a decorative design, or pattern, incorporated therein. Such rods have the pattern extending longitudinally therethrough at right angles to the spread of the pattern, thus adapting the rods to be severed diametrically across into discs usable for buttons, for example.

It has heretofore been proposed to produce items of the general character indicated by assembling units of plastic into an embryo rod and then uniting the units either by extruding the embryo rod, or by severing the embryo rod into discs and uniting the portions of each individual disc by subjecting the disc to a molding operation. These processes, requiring, as they do, the utilization of extrusion or of molds, embody certain complications that it is desirable to eliminate. I have devised a process by which individual rods initially assembled to give an embryo rod displaying the desired pattern, are united into a finished product without the necessity of extrusion or molding; and, furthermore, this process provides for the utilization, as a unit of the uniting apparatus, of a portion of the plastic that is to become embodied in the rod. Also the process provides for the production of a substantially limitless variety of designs, readily and inexpensively.

One object of the invention is to provide a process for the manufacture of patterned plastic stock, for example rods. A further object is to provide such a process wherein a portion of the plastic destined for incorporation in the rod is utilized as an apparatus feature in the practice of the process. A further object is to provide plastic stock for use in the production of e. g. buttons, checks, etc. A further object is to provide decorative buttons, checks, etc. To these ends and also to improve generally upon processes and articles of the general character indicated, my invention consists in the various matters hereinafter described and claimed.

In general, these objects are accomplished by assembling into an embryo rod, a number of rods of thermoplastic material, e. g. cellulosic plastic, to present a desired pattern extending crosswise of the embryo rod and longitudinally therethrough, the individual rods having a distinguishing relationship among themselves, for example having different colors, to produce the pattern; and the embryo rod is then introduced into an envelop, the envelop evacuated, and the assembly subjected to hydraulic pressure and to temperature in order to unite the elements of the embryo rod into a finished rod. In particular accordance with the invention, the envelop is itself of thermoplastic material so that in the process it becomes permanently united with the individual rods of plastic, and thus becomes an integral portion of the final rod. During the operations the individual elements become thoroughly united into a unitary structure. Furthermore, by varying the number of individual rods, their specific character as regards their distinguishing relationship, e. g. color, opacity, transparency, etc., and the distinguishing relationship of the plastic envelop, an almost limitless variety of designs may be produced.

Without restricting the invention thereto it is described with more particular reference to the accompanying drawing in which: Fig. 1 is a perspective view of individual rods assembled into an embryo rod; Fig. 2 is a longitudinal cross section of the envelop with the embryo rod, illustrated in Fig. 1, received therein; Fig. 3 is an enlarged diametrical cross-section taken substantially on the line 3—3 of Fig. 2 and showing the appearance of the entire embryo rod, including therein the envelop, before application of the consolidating temperature and pressure; Fig. 4 is an end view of the consolidated rod after its subjecting to temperature and pressure, thus giving the final rod; Figs. 5 to 9 inclusive are illustrations of various designs produced in accordance with the process; Fig. 10 is a view similar to Fig. 3 but showing the assembled individual rods received in an envelop of a material and character, e. g. a rubber bag, not intended for uniting with the individual rods; and Fig. 11 is an end view of the rod produced when operating with the rubber bag of Fig. 10. As is evident, the figures of the drawing are to various scales. In Figures 4 to 9 and 11, the cross lining is to indicate difference in the appearance of different portions, as differences in color, and not to indicate cross sectioning.

Without restriction of the invention thereto, the production of a rod of cellulose nitrate plastic in accordance with the invention will serve as a specific example. The material is cellulose nitrate plastic of any preferred, or standard composition, e. g. (parts by weight) cellulose nitrate 100, camphor 33, ethyl alcohol (formula 2B) 63. From this material are produced, by methods well known in the art, e. g. extrusion, seven rods and a tube or envelop, and the solvent content therein is reduced to a small amount, but sufficient to assist in the adhesion of the elements each to the other under temperature and pressure. The plastic may of course include such coloring matter and stabilizer as is desired. In the present instance the consolidated rod, and hence the discs or buttons to be severed therefrom, embodies six opaque items surrounding, and surrounded by, transparent plastic. Thus, referring to Figs. 1 to 4 inclusive, there are a central transparent rod 1, six opaque, e. g. white, rods 2 and a transparent border 3.

The rods 1 and 2 are bundled together as indicated in Fig. 1 and, for convenience in handling and to initially fix the embryo design, are attached to each other. This is conveniently done by holding the rods in contact and dipping one end of the bundle in a suitable cement having as one of its ingredients a solvent for the plastic, for an inch or two; removing the excess solvent and allowing the dipped portions of the bundle to stick together; inverting the bundle and similarly treating the opposite end; immersing the bundle for its whole length in a solvent; and withdrawing the bundle and allowing it to stand in an upright position long enough to allow it to dry sufficiently to permit handling at room temperature. In dipping the rods it is important that the cement come in contact with all surfaces. As a medium for cementing purposes ordinary commercial ethyl acetate is satisfactory, and with ethyl acetate I have found it satisfactory to dip the rods for about two or three seconds, the criterion for the dipping time being simply a thorough wetting of the rods.

A tube 4 of transparent cellulose nitrate plastic such as that of the rods, and with one end sealed as at 5 is provided, of an inside diameter slightly greater than the maximum diameter of the rod assembly, and the bundle of rods is introduced therein. The length of the tube is such as to provide for the sealed end 5, and the portion 6 of sufficient length to permit of its ultimate sealing also. If desired, of course, the sealing at 5 may be carried out after the introduction of the bundle, rather than before; and, in either case may be done in any suitable way as by coating the interior wall of the tube with a suitable cement, e. g. pyroxylin-containing solution, and then subjecting the tube to heat (as on a hot plate) and squeezing the ends of the tube together. After the introduction of the bundle the interior wall of the open end 6 of the tube is then coated with cement up to the adjacent end of the bundle of rods. The tube is then stoppered as with a rubber stopper 7, there being a sufficient length of tube between the stopper and the adjacent end of the bundle of rods to permit the sealing of the tube by the collapsing thereof as along the line $a$—$a$. The stopper 7 is provided with an e. g. glass tube 8 for the exhaustion of air from the tube 4. Desirably the stopper is inserted while the cement, with which the interior of the end 6 of the tube 4 has been coated, is soft, in order to insure an effective seal between the stopper and the walls of the tube.

The glass tube is now connected with a vacuum line and the tube 4 immersed, starting with the end 5, in a bath of hot water to a distance approximately one inch below the top (stopper-adjacent) end of the bundle of assembled rods, the water being sufficiently hot to soften the tube. As the tube is evacuated the walls collapse against the sides of the rods and the tube may then be lowered entirely into the water so as to continue the evacuation and to collapse the walls of the tube above the upper end of the rods. This collapsing seals the stoppered end by the walls of the tube adhering to each other approximately at the line $a$—$a$. The whole assembly is then removed from the hot water tank and the tube severed between the sealing and the stopper. The assembly is then allowed to cool. There results the bundle of rods surrounded along its entire length with the tube 4 entirely sealed at both ends to give a closed envelop containing the bundle of rods, the tube 4 being in close and intimate contact with the adjacent side surfaces of the rods 2.

The assembly is now subjected to a temperature sufficient to soften the plastic, and a pressure to thoroughly consolidate the items and cause their permanent uniting into an integral mass. Conveniently this is done by immersing the assembly in a container or "gun" provided with means for introducing hot water under hydraulic pressure, such apparatus being well known in the art. The temperature of the water and the pressure to which plastic stock should be subjected to insure thorough uniting thereof will of course vary with particular conditions but will in any case be evident to those skilled in the art. I have found that the subjection of the assembly to water at a temperature of 200° F., under 3,000 pounds pressure per square inch on the gauge, for 20 minutes, is generally adequate. This is followed by cooling for 20 minutes under the stated pressure with the water at 60° F.

After the completion of the pressing operation the now thoroughly compacted and welded mass may be subjected to seasoning for the purposes of removing any absorbed water from the surface, or for the removal of solvent used in connection with the dipping of the assembled rods 1 and 2, all as will be understood by those skilled in the art. Seasoning may be omitted if so desired, the desirability of seasoning in any particular case depending, of course, entirely upon the use of the discs or buttons to be severed from the finished rod. The "overhangs" at 5 and 6 are of course severed from the mass at the end of the assembly of rods.

The pressure to which the assembly is subjected forces the units into intimate contact and closes and fills all interstices therebetween. The particular shape of the initial rods 1 and 2, their number, and the particular arrangement in which they are bundled influence the shapes that the particular units ultimately acquire; so that by varying these factors differences in the final shapes of the units may be readily arrived at. For example, Fig. 4 substantially illustrates the shapes obtained when using the seven cylindrical rods as described above; and in this case all of the rods had substantially the same solvent content, so that they were equally affected by the temperature and pressure. Obviously, by combining in the same assembly rods of seasoned, partially seasoned, and/or unseasoned material, so that some rods are rendered softer by a given temperature than are others, the changing of the shapes of certain of the rods (due to their greater softness) to a greater degree than the shapes of others are changed may be controlled. It will be understood by those skilled in the art that when material less than thoroughly seasoned is used, the strength of the cement used in the assembly of the rods should, of course, be altered as well as the time of dipping the rods; or, in other words the less the rods are seasoned, and therefore the more the solvent they contain, the less can be the strength of the cement. Also as the amount of seasoning is increased the temperature and pressure may need to be increased, as is plain.

In referring to "seasoned", "partially seasoned" and "unseasoned" stock it will be, of course, understood by those skilled in the art that these terms are used, in the art with a considerable degree of flexibility. Generally speaking, however, seasoned stock has a solvent content of say, 2 to 4%, unseasoned stock has a solvent content of approximately 8 to 12%, and partially seasoned stock has an intermediate solvent content.

When the above detailed process is used for the production of buttons of approximately one inch in diameter I have found it convenient to use rods 1 and 2 about .237 inch in diameter, and about 30 inches in length. The tube 4 is, as stated above, of slightly greater interior diameter than the rod assembly; has a wall thickness sufficient to bring the entire assembly up to a diameter slightly greater than the desired finished diameter of the buttons (in order to allow for shrinkage due to seasoning); and may have an overlap at the end 6 of approximately three inches. It will be understood that upon the completion of the consolidated rod it is severed crosswise into discs or buttons. These discs may be subjected to such further treatment as is desired, such as polishing, the punching of thread holes, etc. Although the discs as severed from the rods are thoroughly welded and consolidated, so that molding for the purpose of integrating the discs is unnecessary, the discs may be molded if for any purpose it be desired.

As illustrating further possibilities of design, reference is made to Figs. 5 to 9 inclusive; but it will be understood that a very great number of designs in addition to those here illustrated, may be produced by the process. Fig. 5 illustrates the results of a combination of seasoned and partially seasoned rods, the rods 9 having been more thoroughly seasoned than the rods 10 (and the mass also including tubing 12). In Figs. 6 and 7 are illustrated the results of the use of a combination of seasoned rods with unseasoned tubing, the rods being designated as 11 and the tubing being designated as 12. In Fig. 8 is illustrated an effect produced by combining sheet stock with rods and a tube, the sheet stock being designated as 13, the rods 14 and tube 15. The process is obviously not confined to the production of circular outlines but is adapted to the production of other shapes as well, this being illustrated in Fig. 9 showing the effect obtained by using a central triangular bundle of three rods surrounded by two tubes.

While the process has been above described as including the utilization, and embodiment in the ultimate consolidated rod, of an envelop of thermo plastic material, certain advantageous features of the process may be practiced without the essential inclusion of this feature. Thus, as illustrated in Fig. 10 the envelop 16 may be of a material adapting it for use as an envelop merely, e. g. it may be a rubber bag. The bag will be used as is the plastic tube 4 except that, being of material not adapted to be permanently adherent to the thermo plastic rods, it will not become permanently consolidated therewith and will ultimately be stripped therefrom. In Fig. 11 is shown a rod section, or button, produced in this manner. If desired, of course, the entire assembly, i. e. the tube 4 and the bundle of rods 1 and 2, may be enclosed in a rubber bag for the combining or compositing operation, but I have not found such a procedure of particular advantage.

While nitrocellulose plastic has been more particularly referred to above, it will be understood that other thermo plastic materials may be used in the practice of the process, e. g. plastics of other cellulose esters e. g., cellulose acetate, and plastics of cellulose ethers, e. g. ethyl cellulose and benzyl cellulose; and also thermo plastic resins as synthetic resins of the vinyl acetate, acrylic acid esters, methacrylic acid esters, polyhydric alcohol-polybasic acid (glyptal), styrol, and derivatives of vinyl acetate (e. g. interpolymers with aldehydes), types. Furthermore, in certain cases some of the units may be of one plastic, and others of the units of a different plastic, in the same assembly, care being taken, of course, that solvents, cements, and specific plastics are compatible with each other to the end of securing proper welding and permanent adhesion between the various units.

It will be understood that while the use of cylindrical rods ordinarily recommends itself, rods of a cross section other than circular may be used if desired; and, furthermore, the tubes may be of varying cross sectional shapes.

I claim:

1. The method of producing a patterned thermoplastic body in the character of a rod having a pattern spread crosswise thereof and extending longitudinally therethrough which method comprises, forming a bundle of thermoplastic bodies of distinguishing relationship to present elements of the pattern spread crosswise of the bundle, surrounding the bundle with an envelope of thermoplastic material, and subjecting the entire assembly to heat and direct fluid pressure to consolidate said assembly into a unitary rod-like body, with the enveloping body thus completing the pattern.

2. The method of producing a patterned cellulosic derivative plastic body in the character of a rod having a pattern spread crosswise thereof and extending longitudinally therethrough which method comprises, forming a bundle of cellulosic derivative plastic bodies of distinguishing relationship to present elements of the pattern spread crosswise of the bundle, surrounding the bundle with an envelope of cellulosic derivative plastic, and subjecting the entire assembly to heat and direct fluid pressure to consolidate said assembly into a unitary rod-like body, with the enveloping body thus completing the pattern.

3. A method as recited in claim 2 in which at least one of the cellulosic derivative plastic units is of cellulose ester plastic.

4. A method as recited in claim 2 in which at least one of the cellulosic derivative plastic units is of cellulosic ether plastic.

5. A method as recited in claim 2 in which at least one of the cellulosic derivative plastic units is of cellulose nitrate plastic.

6. A method as recited in claim 2 in which at least one of the cellulosic derivative plastic units is of cellulose acetate plastic.

7. The method of producing a patterned thermoplastic body in the character of a rod having a pattern spread crosswise thereof and extending longitudinally therethrough which method comprises, forming a bundle of rod-like thermoplastic bodies of distinguishing relationship to present elements of the pattern spread crosswise of the bundle, introducing the bundle into a surrounding envelop of thermoplastic material, evacuating the envelop, sealing the envelop while evacuated, and subjecting the entire assembly to heat and direct fluid pressure to thereby consolidate the same into a unitary rod-like body with the envelop integral therewith and thus completing the pattern.

8. The method of producing a patterned thermoplastic body in the character of a rod having a pattern spread crosswise thereof and extending longitudinally therethrough which method comprises, assembling a central rod-like body of thermoplastic material and a surrounding envelop of thermoplastic material, the materials of the body and of the envelop being of distinguishing relationship with respect to each other, and subjecting the entire assembly to heat and direct fluid pressure to consolidate said assembly into a unitary rod-like body, with the enveloping body combined with the central body to present the pattern.

ALBERT TANNER BAILEY.